US008204775B2

(12) United States Patent
Mathews et al.

(10) Patent No.: US 8,204,775 B2
(45) Date of Patent: *Jun. 19, 2012

(54) SYSTEMS, METHODS AND COMPUTER PROGRAM PRODUCTS FOR MODELING A MONETARY MEASURE FOR A GOOD BASED UPON TECHNOLOGY MATURITY LEVELS

(75) Inventors: Scott H. Mathews, Seattle, WA (US); Vinay T. Datar, Mercer Island, WA (US); Kevin Feely, Kent, WA (US); David J. Gauss, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 248 days.

This patent is subject to a terminal disclaimer.

(21) Appl. No.: 12/603,215

(22) Filed: Oct. 21, 2009

(65) Prior Publication Data

US 2010/0100425 A1    Apr. 22, 2010

Related U.S. Application Data

(62) Division of application No. 10/453,395, filed on Jun. 3, 2003, now Pat. No. 7,627,494.

(51) Int. Cl.
*G06Q 10/00* (2012.01)
(52) U.S. Cl. ...................................... 705/7.29; 705/7.36
(58) Field of Classification Search .................. 705/7.29, 705/7.36
See application file for complete search history.

(56) References Cited

U.S. PATENT DOCUMENTS

| | | | |
|---|---|---|---|
| 5,377,095 A | 12/1994 | Maeda et al. | |
| 5,692,233 A | 11/1997 | Garman | |
| 5,710,578 A | 1/1998 | Beauregard et al. | |
| 5,960,407 A | 9/1999 | Vivona | |
| 6,061,662 A | 5/2000 | Makivic | |
| 6,078,893 A | 6/2000 | Ouimet et al. | |
| 6,078,901 A | 6/2000 | Ching | |

(Continued)

FOREIGN PATENT DOCUMENTS

EP    1 178 416 A1    2/2002
JP    2001357189 A    12/2001

OTHER PUBLICATIONS

Eric L. Burgess, Hany S. Gobrieal; *Integrating Spacecraft Design and Cost-Risk Analysis Using NASA Technology Readiness Levels*; Feb. 1996; 29th Annual DoD Cost Analysis Symposium, Leesburg, Virginia; 14 pages; The Aerospace Corporation; Herndon, Virginia.
Ray Nelson; Risk Analysis Using @RISK® and Crystal Ball®; *Oracle of IIF*; Dec. 2000; pp. 8-11.
*Risk Analysis Overview—What is Risk?*; Available at <http://www.decisioneering.com/risk-analysis-print.html> (visited Feb. 19, 2002).
*Real Options with Monte Carlo Simulation*; Available at <http://www.puc-rio.br/marco.ind/monte-carlo.html> (visited Feb. 25, 2002).

(Continued)

*Primary Examiner* — Jonathan G Sterrett
(74) *Attorney, Agent, or Firm* — Alston & Bird LLP

(57) ABSTRACT

A systems, methods and computer program products are provided for modeling a monetary measure of a good, such as a cost or revenue associated with the good. A method begins by selecting at least one qualitative measure of maturity for at least one technology associated with the good, where each qualitative measure of maturity is associated with a distribution such that each technology is correspondingly associated with a distribution. Next, a monetary point is associated with each technology, and thereafter a monetary distribution is determined for each technology based upon a respective monetary point and a respective distribution. A plurality of monetary values are selected by randomly selecting the plurality of monetary values for each technology based upon a respective monetary distribution. Finally, the monetary measure for the good are modeled based upon the selected monetary values for each technology.

15 Claims, 4 Drawing Sheets

U.S. PATENT DOCUMENTS

| | | | |
|---|---|---|---|
| 6,157,918 | A | 12/2000 | Shepherd |
| 6,205,431 | B1 | 3/2001 | Willemain et al. |
| 6,321,205 | B1 | 11/2001 | Eder |
| 6,321,212 | B1 | 11/2001 | Lange |
| 6,381,586 | B1 | 4/2002 | Glasserman et al. |
| 6,393,406 | B1 | 5/2002 | Eder |
| 6,629,082 | B1 | 9/2003 | Hambrecht et al. |
| 6,810,332 | B2 | 10/2004 | Harrison |
| 6,853,952 | B2 | 2/2005 | Chadwick |
| 6,862,579 | B2 | 3/2005 | Mathews et al. |
| 6,910,017 | B1 | 6/2005 | Woo et al. |
| 6,963,854 | B1 | 11/2005 | Boyd et al. |
| 7,085,734 | B2 | 8/2006 | Grant et al. |
| 7,110,956 | B1 | 9/2006 | Drake et al. |
| 7,133,848 | B2 | 11/2006 | Phillips et al. |
| 7,171,391 | B2 | 1/2007 | Aday et al. |
| 7,197,474 | B1 | 3/2007 | Kitts |
| 7,315,842 | B1 | 1/2008 | Wang |
| 7,349,878 | B1 | 3/2008 | Makivic |
| 7,398,221 | B1 | 7/2008 | Bensoussan et al. |
| 7,574,394 | B2 | 8/2009 | Chorna et al. |
| 2001/0041996 | A1 | 11/2001 | Eder |
| 2002/0010667 | A1 | 1/2002 | Kant et al. |
| 2002/0116348 | A1 | 8/2002 | Phillips et al. |
| 2002/0143604 | A1 | 10/2002 | Cox et al. |
| 2003/0014337 | A1 | 1/2003 | Mathews et al. |
| 2003/0033191 | A1 | 2/2003 | Davies et al. |
| 2003/0078870 | A1 | 4/2003 | Datar et al. |
| 2003/0115128 | A1 | 6/2003 | Lange et al. |
| 2003/0144897 | A1 | 7/2003 | Burruss et al. |
| 2003/0236738 | A1 | 12/2003 | Lange et al. |
| 2004/0068455 | A1 | 4/2004 | Jacobus et al. |
| 2004/0098327 | A1 | 5/2004 | Seaman |
| 2004/0128221 | A1 | 7/2004 | Pandher |
| 2004/0249642 | A1 | 12/2004 | Mathews et al. |
| 2005/0102213 | A1 | 5/2005 | Savasoglu et al. |
| 2005/0125318 | A1 | 6/2005 | Jameson |
| 2006/0253355 | A1 | 11/2006 | Shalen |
| 2007/0011065 | A1 | 1/2007 | Sreenivasan et al. |
| 2007/0016891 | A1 | 1/2007 | Cantor |
| 2007/0022031 | A1 | 1/2007 | Sponholtz et al. |
| 2007/0050282 | A1 | 3/2007 | Chen et al. |
| 2007/0106576 | A1 | 5/2007 | Jung et al. |
| 2007/0112661 | A1 | 5/2007 | Mathews |
| 2007/0150390 | A1 | 6/2007 | Mathews et al. |
| 2007/0150391 | A1 | 6/2007 | Mathews et al. |
| 2007/0150392 | A1 | 6/2007 | Mathews et al. |
| 2007/0150393 | A1 | 6/2007 | Mathews et al. |
| 2007/0150394 | A1 | 6/2007 | Mathews et al. |
| 2007/0150395 | A1 | 6/2007 | Nakamoto et al. |
| 2007/0162376 | A1 | 7/2007 | Mathews et al. |
| 2007/0299753 | A1 | 12/2007 | Averbuch et al. |
| 2007/0299757 | A1 | 12/2007 | Horowitz |
| 2008/0015871 | A1 | 1/2008 | Eder |
| 2008/0109341 | A1 | 5/2008 | Stiff et al. |
| 2008/0133429 | A1 | 6/2008 | Horowitz |
| 2008/0147568 | A1 | 6/2008 | Wang |
| 2008/0167984 | A1 | 7/2008 | Courey et al. |
| 2008/0208678 | A1 | 8/2008 | Walser et al. |
| 2008/0228605 | A1 | 9/2008 | Wang |
| 2008/0288394 | A1 | 11/2008 | Eder |
| 2009/0024543 | A1 | 1/2009 | Horowitz et al. |
| 2009/0030822 | A1 | 1/2009 | Cresswell |
| 2009/0043604 | A1 | 2/2009 | Jung et al. |
| 2009/0043683 | A1 | 2/2009 | Jung et al. |
| 2009/0099955 | A1 | 4/2009 | Peters et al. |
| 2010/0216545 | A1 | 8/2010 | Lange et al. |
| 2011/0081955 | A1 | 4/2011 | Lange et al. |
| 2012/0022995 | A1 | 1/2012 | Lange |

OTHER PUBLICATIONS

Cone of Uncertainty; Available at <http://www.real-options.com/cou.html> (visited Oct. 11, 2002).

Weston Copeland; Edition; *Managerial Finance*; 1990; pp. 481-487, 406-407, 642 (10 pages); 9*th* Edition; ISBN 0 03 558832.

Alan Shapiro; *Modern Corporate Finance*; 1990; pp. 438, 261; ISBN 002409530-3.

Felstead, "A Mathematical Approach to Cost Minimization of Satcom Systems", 1996, IEEE, pp. 352-356.

Morrison, "Life Cycle Approach to New Product Forecasting", Summer 1995, *The Journal of Business Forecasting Methods & Systems*, 14, 2, ABI/INFORM Global, p. 3.

Eskin, "Dynamic Forecast of New Product Demand Using a Depth of Repeat Model", May 1973, *JMR Journal of Marketing Research*, 10, 0000002, AB/INFORM Global, p. 115.

Bassin, "The Logistic Curve—another approach to new product forecasting", Fall 1991, *The Journal of Business Forecasting Methods & System*, 10, 3, ABI/INFORM Global, p. 14.

Paszko et al., "Product Life Cycles and Profitability", Summer 1989, *The Journal of Business Forecasting Methods & Systems*, 8, 2; ABI/INFORM Global, p. 26.

Nelson, "The Product Life Cycle of Engineered Metals: a comparative analysis of the application product life cycle theory", Spring 1992, *The Journal of Business & Industrial Marketing*, 7, 2, ABI/INFORM Global, p. 5.

Curry, "FALCCM-H: Functional Avionics Life Cycle Cost Model for Hardware", © 1993, IEEE, pp. 950-953.

Xie et al., "Probabilistic Design Optimization of Aircraft Structures with Reliability, Manufacturability, and Cost Constraints", Apr. 7-10, 2003, 44*th* AIAA/ASME/ASCE/AHS Structures, Structural Dynamics, and Materials Conference, Norfolk, VA, p. 1.

Marx et al., "Knowledge-based manufacturing and structural design for a high speed civil transport", 1994, 1*st* Industry / Academy Symposium on Research for Future Supersonic and Hypersonic Vehicles, Greensboro, NC pp. 1-6.

Schrage, "Technology for Rotorcraft Affordability Through Integrated Product/Process Development (IPPD)", 1999, American Helicopter Society 55*th* Annual Forum, Montreal, Canada, pp . 1-19.

Kamath et al., T.P.M. (2002) A Bayesian approach to a dynamic inventory model under an unknown demand distribution. Computers & Operations Research, v. 29, pp. 403-422.

Hirschleifer (1980) Price Theory and Applications. Prentice-Hall: New York, pp. 126-151.

Morris (1992) Market Oriented Pricing. Quarom Books: New York, pp. 172-173.

Evans and Berman (1992). Marketing. Macmillan: New York. Chapter 18: Overview of Price Planning, pp. 526-547.

Berry et al., Automobile Prices in Market Equilibria. Econometrica, vol. 63, No. 4 (Jul. 1995), pp. 841-890.

Monroe, (1978) Models for Pricing pp. 413-428. Decisions, *Journal of Marketing Research*, vol. XV (August) pp. 413-428.

Urban et al., (1968) A New Product Analysis and Decision Model, *Management Science*, vol. 14, No. 8 (April), pp. B490-B519.

Yang et al. (2003) Bayesian Analysis of Simultaneous Demand and Supply, Quantitative Marketing and Economics, vol. 1, pp. 251-275.

Cortazar et al., "Monte Carlo Evaluation Model of an Undeveloped Oil Field", *Journal of Energy Finance & Development*, vol. 3, No. 1, pp. 73-84. Available online Jan. 13, 1998. ISSN: 1085-743.

Charnes, John M., "Using Simulation for Option Pricing", The University of Kansas School of Business, Dec. 13, 2000, Presented at 2000 Winter Simulation Conference, Dec. 10-13, 2000, Wyndham Palace Resort and Spa, Orlando, FL, www.wintersim.org, pp. 151-157.

MacMillan, Fional, "Risk, Uncertainty and Investment Decision-Making in the Upstream Oil and Gas Industry", MA Hons (University of Aberdeen), Oct. 2000, A thesis presented for the degree of Ph.D. at the University of Aberdeen.

Longstaff, et al., "Valuing American Options by Simulation: A Simple Least-Squares Approach", Anderson Graduate School of Management, eScholarship Repository, University of California, http://repositories.cdlib.org/anderson/fin/1-01, 2001.

Breeden et al., "Prices of State Contingent Claims Implicit in Options Prices", *Journal of Business,* vol. 51, No. 4, pp. 621-651 (Oct. 1978).

International Search Report dated Nov. 19, 2008 of International Application No. PCT/US04/17258.

Largent, "A probabilistic risk management based process for planning and management of technology development", PhD Dissertation Georgia Tech Aerospace Engineering, Mar. 2003, downloaded Sep. 3, 2008 [retrieved from http://smartech.gatech.edu/handle/1853/12168], pp. 1-79, 210-271.

SYSTEMS, METHODS AND COMPUTER PROGRAM PRODUCTS FOR MODELING A MONETARY MEASURE FOR A GOOD BASED UPON TECHNOLOGY MATURITY LEVELS

CROSS-REFERENCE TO RELATED APPLICATIONS

This application is a divisional of U.S. patent application Ser. No. 10/453,395, entitled: Systems, Methods and Computer Program Products for Modeling a Monetary Measure for a Good Based Upon Technology Maturity Levels, filed Jun. 3, 2003, now U.S. Pat. No. 7,627,494 which is hereby incorporated herein in its entirety by reference.

FIELD OF THE INVENTION

The present invention generally relates to systems, methods and computer program products for modeling cost and associated revenue associated with a project for the manufacture and sale of a good and, more particularly, relates to systems, methods and computer program products for modeling cost and associated revenue associated with a project based upon at least one technology maturity level.

BACKGROUND OF THE INVENTION

In many industries, decisions about projects for the manufacture and sale of a good require manufacturers to estimate technical risk, or technical maturity, associated with the state of development of the project in order to correctly determine success probabilities and investment levels for the project. In this regard, development of the project can include one or more different technologies, with different technologies in different stages of development. For example, a project can include a technology associated with materials utilized to manufacture the good that is in one stage of development, and a technology associated a particular manufacturing process that is utilized during the production of the good that is in another stage of development.

Whereas information regarding technical risk can be useful to manufacturers, such information is often qualitative. As such, it is often difficult to ascertain the impact of risk on the success of the project. For example, one such group of qualitative measures of technical risk, or technical maturity, are the Technology Readiness Levels (TRL's) developed by the National Aeronautics and Space Administration (NASA). As shown in the Table, below, the NASA TRL's represent a qualitative measure of the state of development of the project. As shown, the NASA TRL's consist of nine levels representing various stages of development. More particularly, TRL 1 corresponds to the lowest level of technology maturation. From TRL 1, then, the levels of technology increase through TRL 9, which corresponds to actual successful use of a fully developed project in an applicable environment for the project. At TRL 9, then, development of the project has typically matured past the point of troubleshooting problems discovered during testing, which typically occur at TRL 8.

| NASA Technology Readiness Level (TRL) | |
|---|---|
| TRL 1 | Basic Principles Observed and Reported |
| TRL 2 | Technology Concept and/or Application Formulated |
| TRL 3 | Analytical and Experimental Critical Function and/or Characteristic Proof-of-Concept |
| TRL 4 | Component and/or Breadboard Validation in Laboratory Environment |
| TRL 5 | Component and/or Breadboard Validation in Relevant Environment |
| TRL 6 | System/Subsystem Model or Prototype Demonstration in a Relevant Environment |
| TRL 7 | System Prototype Demonstration in a Space Environment |
| TRL 8 | Actual System Completed and "Flight Qualified" Through Test and Demonstration |
| TRL 9 | Actual System "Flight Proven" Through Successful Mission Operations |

As will be appreciated, the state of development of the technologies associated with a project can have a direct impact on the uncertainty, and as such the risk, associated with the cost and/or revenues of manufacturing and selling the good. In this regard, the ability to correctly estimate the technical risk impact on a project enables manufacturers to make better decisions as to investment and proportion of the investment to the level of project risk. Conventionally, manufacturers have not had the ability to reliably quantify the technical risk of a project proposal that has limited information, as extensive uncertainties, is concerned with new markets or technologies, or does not yet have a well-defined scope or specifications.

SUMMARY OF THE INVENTION

In light of the foregoing background, the present invention provides systems, methods and computer program products for modeling a monetary measure of a good, such as a cost and/or revenue associated with a good, where the model is based upon at least one, and more typically a plurality, of technology maturity levels. The systems, methods and computer program products of embodiments of the present invention are capable of modeling quantitative risk/return as a function of qualitative measures of maturity to thereby reliably quantify the technical risk of a good based upon the level of maturity of the technologies associated with the good. Advantageously, embodiments of the present invention are capable of modeling the quantitative risk/return for technologies at a number of different levels of development, where each level of development has an associated technical risk, or uncertainty. In addition, embodiments of the present invention are capable of modeling quantitative risk/return in a robust manner to model monetary measures in a number of different contexts, without modifying the model to fit a particular monetary measure, good, project or the like. Embodiments of the present invention are thus capable of easily assigning accurate quantitative assessments of risk and return through the extraction of distribution statistical parameters characteristic of representative capital and industry markets. Further, embodiments of the present invention are capable of enabling accurate, rapid and standardized characterization of cost and revenue uncertainties, and enabling rapid prototyping of business case simulations that apply techniques such as the Monte Carlo techniques.

According to one aspect of the present invention, systems, methods and computer program products are provided for modeling quantitative risk/return as a function of a plurality of qualitative measures of maturity, such as technology readiness levels. The method of one embodiment begins by determining a risk/return distribution for each of a plurality of risk values, where the risk values can be ordered from a lowest risk value to a highest risk value. After determining the risk/return distributions, a qualitative measure of maturity is assigned to each of the plurality of risk/return distributions based upon a respective risk value to thereby model quantitative risk/return as a function of the plurality of measures of maturity. Similar to the risk values, the measures of maturity can be ordered from a highest measure of maturity to a lowest measure of maturity. As such, the measures of maturity can be assigned by assigning a higher measure of maturity to a risk/return distribution for a lower risk value.

Advantageously, a risk/return distribution can be determined for each of a plurality of risk values based upon a log mean and a log standard deviation of a lognormal probability density reflecting a respective risk and return pattern of capital markets, such as according to the Capital Asset Pricing Model (CAPM). As such, each risk/return distribution typically comprises a lognormal distribution. In various embodiments, each of the risk/return distributions can be normalized to a mode of one. Additionally, or alternatively, an upper and lower bound of each of the risk/return distributions can be truncated by a predefined percentage. In other embodiments, alternatively or in addition to normalizing and truncating the risk/return distributions, each lognormal risk/return distribution can be converted to a corresponding triangular distribution. Also in such embodiments, assigning a qualitative measure can include assigning a qualitative measure of maturity to each triangular distribution.

According to another aspect of the present invention, a systems, methods and computer program products are provided for modeling a monetary measure of a good, such as a cost or revenue associated with the good. The method of one embodiment begins by selecting at least one qualitative measure of maturity for at least one technology associated with the good. In this regard, each qualitative measure of maturity is associated with a distribution such that each technology is associated with the distribution of the respective qualitative measure of maturity. As such, the qualitative measures of maturity can be selected from a model of quantitative risk/return, as such may be determined as described above.

Next, a monetary point, such as a most likely cost or revenue value, is associated with each technology. A monetary distribution is then determined for each technology based upon the respective monetary point and a respective distribution. A plurality of monetary values are selected by randomly selecting, such as according to the Monte Carlo technique, the plurality of monetary values for each technology based upon the respective monetary distribution. Finally, the monetary measure for the good is modeled based upon the selected monetary values for each technology.

Therefore, the systems, methods and computer program products of embodiments of the present invention are capable of modeling a monetary measure of a good, such as a cost and/or revenue associated with a good, based upon technology maturity levels. In this regard, embodiments of the present invention can model quantitative risk/return as a function of qualitative measures of maturity to thereby reliably quantify the technical risk of a good based upon the level of maturity of the technologies associated with the good. Advantageously, embodiments of the present invention are capable of modeling the quantitative risk/return for technologies at a number of different levels of development, where each level of development has an associated technical risk, or uncertainty. In addition, embodiments of the present invention are capable of modeling quantitative risk/return in a robust manner such that monetary measures can be modeled in a number of different contexts, without modifying the model to fit a particular monetary measure, good, project or the like.

BRIEF DESCRIPTION OF THE DRAWINGS

Figure 1:
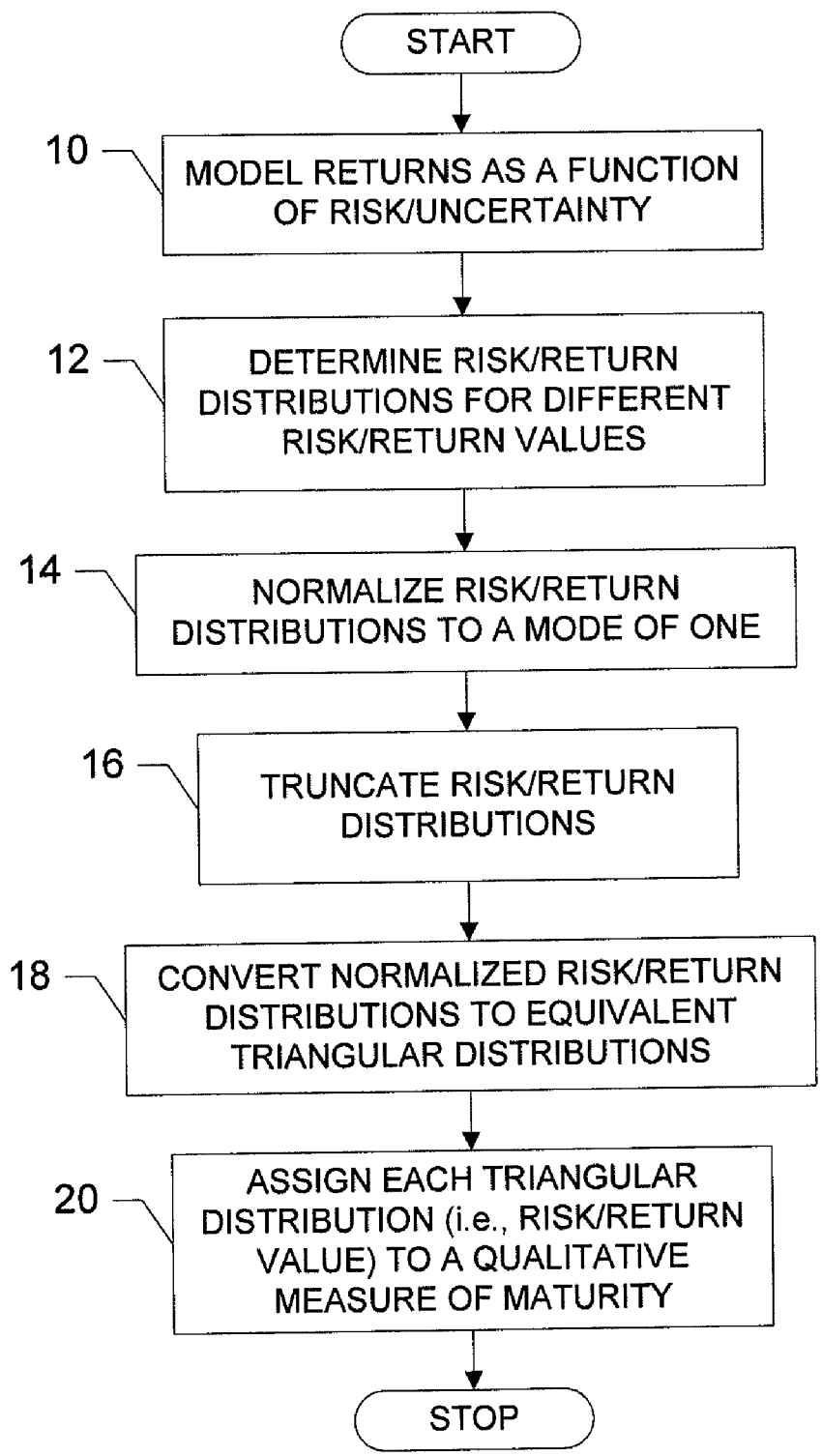
Figure 2:
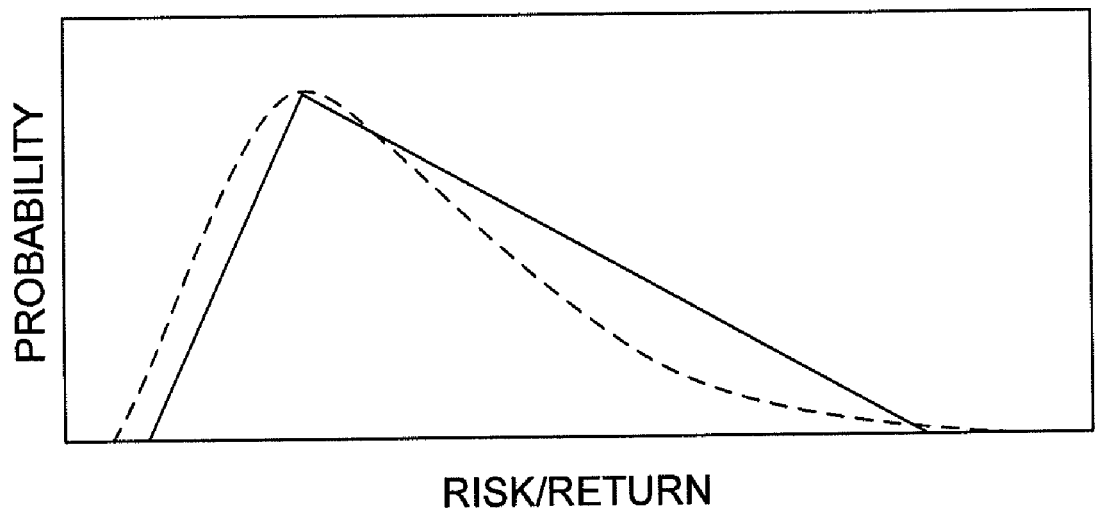
Figure 3:
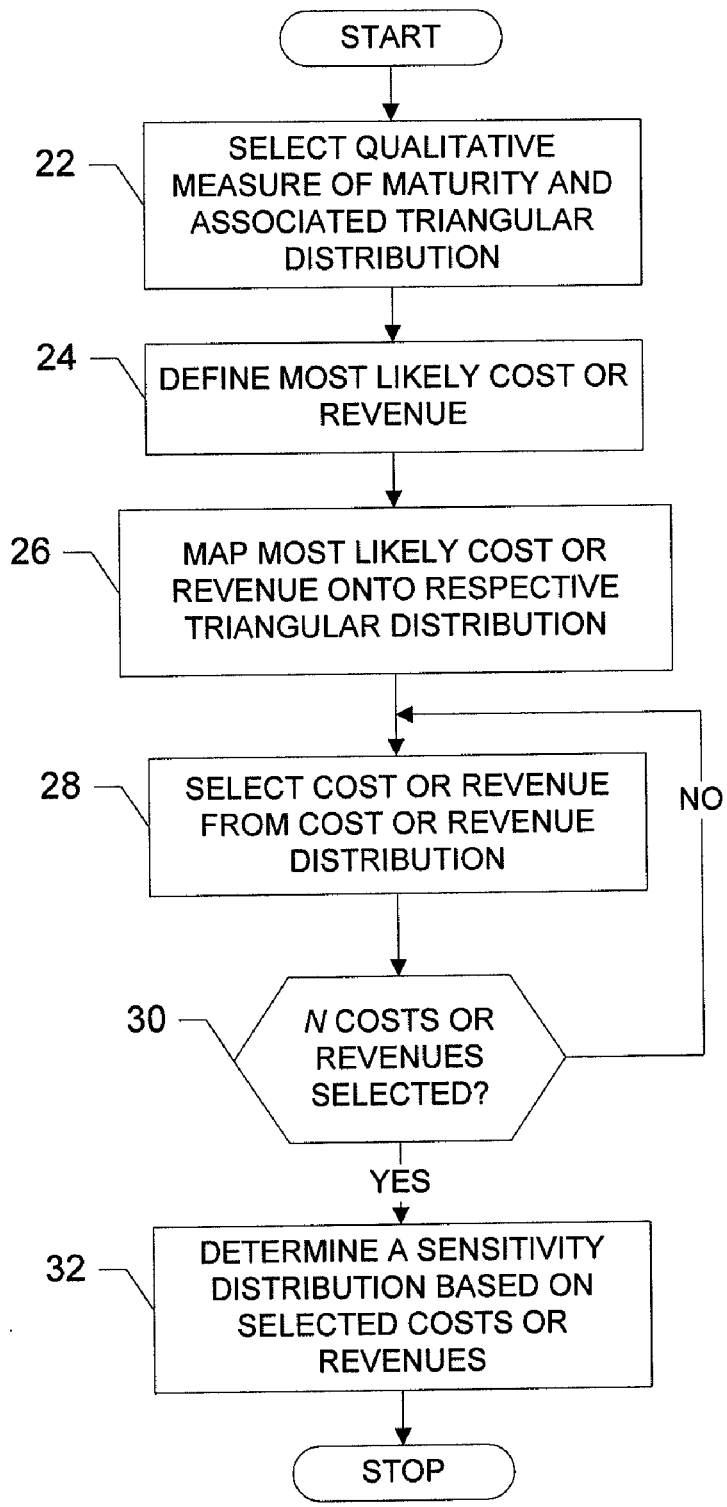
Figure 4:
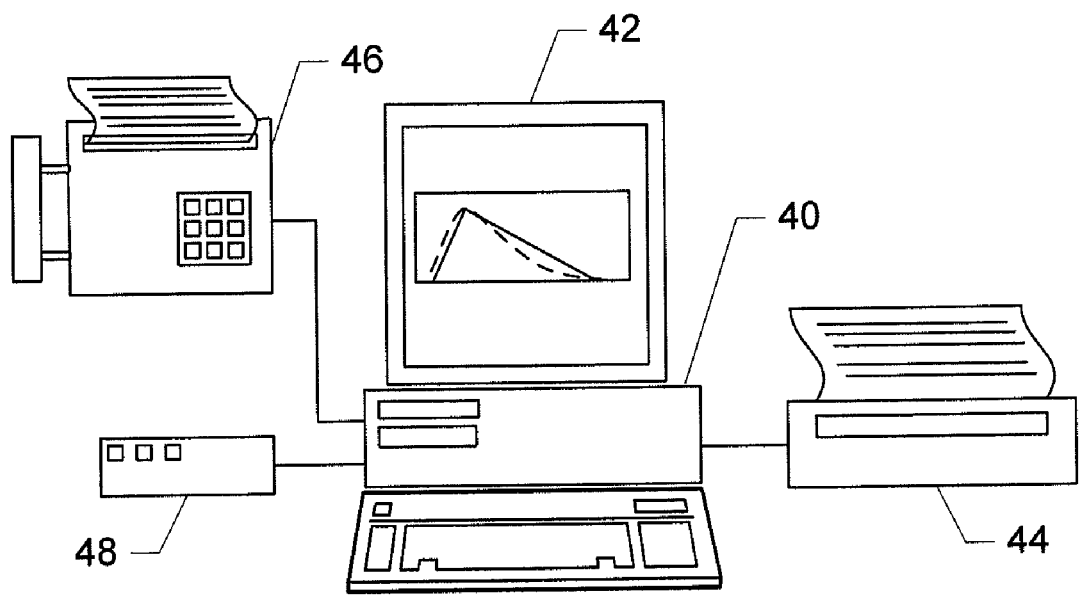

Having thus described the invention in general terms, reference will now be made to the accompanying drawings, which are not necessarily drawn to scale, and wherein:

FIG. 1 is a flow chart illustrating various steps in a method of modeling risk/return as a function of measures of maturity according to one embodiment of the present invention;

FIG. 2 is an illustration of a risk/return distribution and a corresponding triangular distribution according to one embodiment of the present invention;

FIG. 3 is a flow chart illustrating various steps in a method of modeling a monetary measure of a good according to one embodiment of the present invention; and FIG. 4 is a schematic block diagram of the system of one embodiment of the present invention embodied by a computer.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a method of modeling quantitative risk/return as a function of at least one qualitative measure of maturity is shown according to one embodiment of the present invention. As shown, the method of this embodiment can begin by modeling returns as a function of risk, or uncertainty, associated with bringing a good to market. Returns can be modeled in any of a number of different manners, such as by estimators or the like. In one embodiment, for example, the returns are modeled from two return values and associated risk values, as such may be determined by an estimator. Then, assuming an approximately linear relationship between risk and return, the returns can be modeled as a linear function of risk based upon the two return values and associated risk values. For example, according to one embodiment, two return values may comprise 10.0% and 12.5%, with associated risk values comprising 20% and 30%, respectively. With such values, returns can be modeled as a linear function of risk as follows:

$$\text{Return(Risk)} = 0.25 \times \text{Risk} + 5$$

where return and risk are expressed as percentages. As will be appreciated, in addition to utilizing the return model as described below, the return model can be utilized to model future revenues of a good, where the future revenues are subject to an amount of uncertainty. For a description of such an application, see U.S. patent application Ser. No. 10/453,396, entitled: Systems, Methods and Computer Program Products for Modeling Uncertain Future Benefits, filed Jun. 3, 2003, the contents of which is incorporated by reference in its entirety.

Either before, after or as returns are modeled as a function of risk, risk/return distributions are determined for different risk values, as shown in block 12. The risk/return distributions can be determined for any number of different risk values but, in one embodiment, the number of different risk values corresponds to the number of different qualitative measures of maturity, as described below. In this regard, the number of different qualitative measures of maturity are typically predefined. For example, when the number of qualitative measures of maturity equals nine, the number of different risk, or uncertainty, values can comprise those shown in Table 1, along with risk/return distribution can also be defined by a percentage standard deviation of the lognormal probability density reflecting a risk and return pattern of capital markets. By determining the risk/return distributions based upon the risk and return patterns of capital markets, the risk/return distributions can be robustly applied to any of a number of different monetary measures without having to be modified to fit a particular monetary measure, good, project or the like.

As shown in block 12, after determining the risk/return distributions, each risk/return distribution can be normalized to a mode of one, as illustrated in block 14. It will be appreciated by those skilled in the art that at the highest bounds of possible risk/return, goods are typically dropped or re-scoped into different goods. Similarly,

TABLE 1

| Growth Rate | Uncertainty |
|---|---|
| 10.0% | 20% |
| 12.5% | 30% |
| 15.0% | 40% |
| 17.5% | 50% |
| 20.0% | 60% |
| 22.5% | 70% |
| 25.0% | 80% |
| 27.5% | 90% |
| 30.0% | 100% | at the lowest bounds of possible risk/return, several factors, such as competitors entering the market and reaching capacity of the market, act to limit the return. In this regard, whereas the risk/return distributions can be determined to define the entire range of possible risk/return, in one embodiment the lowest and highest bounds of each risk/return distribution are truncated, as shown in block 16. For example, the each bound can be truncated by a predefined percentage (e.g., 2.5%) so that the risk/return distributions define the rage of most likely risk/return. According to one exemplar embodiment, then, the risk/return distributions can be summarized for a number of different risk values, as shown below in Table 2.

More particularly, the lognormal standard deviation (LogStdDev), lognormal mean (LogMean), mode (Mode) and % values (97.5% and 2.5% values) shown in Table 2 can be determined according to the following equations:

$$LogMean = -\frac{1}{2} \times \ln(((StdDev/\text{Mean})^2 + 1)/Mean^2)$$

$$LogStdDev = \sqrt{\ln((StdDev/\text{Mean})^2 + 1)}$$

$$\text{Mode} = e^{LogMean - LogStdDev^2}$$

$$\% \text{ value} = e^{LogMean + LogStdDev \times NormsInv(percent)}$$

For more information on such a method of determining the preceding values, see U.S. patent application Ser. No. 10/453,396, entitled: Systems, Methods and Computer Program Products for Modeling Uncertain Future Benefits.

As shown, Table 2 includes the mean value for each risk/return distribution. As will be appreciated by those skilled in the art, the mean value cannot be directly determined but, instead, may be determined as that value that uniquely satisfies a lognormal distribution that has two constraints: (1) a standard deviation of X %, and (2) a mode value equal to one. More particularly, as can be seen from the previous equations, if the standard deviation is known, but the mean value is not known (as are the lognormal mean and lognormal standard deviation values), solving for the mean value is circular. As such, the only way to solve for the mean value is by utilizing a search algorithm with constraints.

After defining the risk/return distributions, or after normalizing and/or truncating the risk/return distributions, the risk/return distributions can, but need not, be converted to roughly equivalent triangular distributions, as shown in block 18. By converting the risk/return distributions to triangular distributions, subsequent analysis can be performed on more simplified triangular distributions, as opposed to lognormal distributions. And because the bounds of the risk/return distributions have been truncated, the risk/return distributions can be converted to triangular distributions without sacrificing much accuracy during the conversion. For an example of a risk/return distribution and a corresponding triangular distribution, see FIG. 2. It should be understood, however, that the risk/return distributions need not be converted to triangular distributions to practice the present invention.

The risk/return distributions can be converted to triangular distributions according to any of a number of different techniques. According to one technique, for

TABLE 2

| StdDev. Dist. | LogStdDev. | LogMean | 97.5% | 2.5% | Mode | Mean |
|---|---|---|---|---|---|---|
| 20% | 0.19 | 0.04 | 1.50 | 0.72 | 1.00 | 1.06 |
| 30% | 0.27 | 0.07 | 1.80 | 0.64 | 1.00 | 1.11 |
| 40% | 0.33 | 0.11 | 2.13 | 0.58 | 1.00 | 1.18 |
| 50% | 0.39 | 0.15 | 2.47 | 0.55 | 1.00 | 1.25 |
| 60% | 0.43 | 0.19 | 2.61 | 0.52 | 1.00 | 1.32 |
| 70% | 0.47 | 0.22 | 3.16 | 0.50 | 1.00 | 1.40 |
| 80% | 0.51 | 0.26 | 3.51 | 0.48 | 1.00 | 1.47 |
| 90% | 0.54 | 0.29 | 3.85 | 0.46 | 1.00 | 1.55 |
| 100% | 0.67 | 0.32 | 4.20 | 0.45 | 1.00 | 1.62 | example, the minimum and maximum values of each triangular distribution can be selected to equal the truncated lower and upper bounds, respectively, of a respective risk/return distribution. Then, like the risk/return distributions, the triangular distribution can be normalized to a mode equal to one. Therefore, continuing the example of Table 2 above, the triangular distributions associated with respective risk/return distributions of Table 2 can be summarized as in Table 3, below. As will be appreciated by those skilled in the art, neither the risk/return distributions nor the triangular distributions need be normalized to a mode of one. In this regard, as described below, a point, or most likely, cost or revenue can be mapped onto a respective triangular distribution that has not been normalized. In such an instance, the respective triangular distribution can have a mode not equal to one, which can then be accounted for when mapping the most likely cost or revenue onto the respective triangular distribution, as such is known to those skilled in the art.

After converting the risk/return distributions to corresponding triangular distributions, the triangular distributions can be assigned to different qualitative measures of maturity to thereby model risk/return as a function of measures of maturity, as shown in block 20. The qualitative measures of maturity can include any number of different measures that typically describe a number of levels of maturity of a technology from inception through to fully developed. The number of measures of maturity can vary as desired, with each level describing a different level of maturity. Whereas the triangular distributions can be assigned to any of a number of different tainty. Thus, 20% uncertainty is associated with a triangular distribution having a maximum and a minimum of 1.50 and 0.72, respectively, which equal the 2.5% and 97.5% bounds of a risk/return distribution having a 20% standard deviation.

TABLE 3

Risk/Return Distributions

| StdDev. Dist. | LogStdDev. | LogMean | 97.5% | 2.5% | Triangular Distributions | | |
|---|---|---|---|---|---|---|---|
| | | | | | Max | Min | Mode |
| 20% | 0.19 | 0.04 | 1.50 | 0.72 | 1.50 | 0.72 | 1.00 |
| 30% | 0.27 | 0.07 | 1.80 | 0.64 | 1.80 | 0.64 | 1.00 |
| 40% | 0.33 | 0.11 | 2.13 | 0.58 | 2.13 | 0.58 | 1.00 |
| 50% | 0.39 | 0.15 | 2.47 | 0.55 | 2.47 | 0.55 | 1.00 |
| 60% | 0.43 | 0.19 | 2.61 | 0.52 | 2.61 | 0.52 | 1.00 |
| 70% | 0.47 | 0.22 | 3.16 | 0.50 | 3.16 | 0.50 | 1.00 |
| 80% | 0.51 | 0.26 | 3.51 | 0.48 | 3.51 | 0.48 | 1.00 |
| 90% | 0.54 | 0.29 | 3.85 | 0.46 | 3.85 | 0.46 | 1.00 |
| 100% | 0.67 | 0.32 | 4.20 | 0.45 | 4.20 | 0.45 | 1.00 | measures of maturity, in one advantageous embodiment, the triangular distributions are assigned to NASA TRL's, as such are known to those skilled in the art and are described above in the background section.

The triangular distributions can be assigned to the measures of maturity in any of a number of different manners. In one advantageous embodiment, each percentage standard deviation of the risk/return distributions is associated with an equal percentage uncertainty, or risk. For example, the percentage standard deviation of 20% from Table 2 above can be associated with a 20% uncertainty, as such is shown in Table 1. Continuing, then, the percentage standard deviation of 30% from Table 2 can be associated with a 30% uncertainty, as such is shown in Table 1, and so forth. Each uncertainty, in turn, can be associated with a different measure of maturity. As will be appreciated, typically the more mature a technology, the lower the risk. Therefore, each uncertainty can be associated with a measure of maturity, with the lower levels of uncertainty associated with the higher measures of maturity describing higher levels of development. For example, consider the NASA TRL's where level 1 corresponds to the lowest level of development, and levels 2-9 corresponding to increasing levels of development. Taking the percentage uncertainties associated with the percentage standard deviations from Table 2, then, level 1 can be associated with the largest uncertainty, that is, an uncertainty of 100%, while level 9 can be associated with the smallest uncertainty, that is, an uncertainty of 20%, and so forth.

With the measures of maturity associated with percentages of uncertainty that have corresponding percentage standard deviations of the risk/return distributions, each measure of maturity can be associated with a risk/return distribution, and therefore, a triangular distribution. Continuing the example of risk/return distributions and triangular distributions from Tables 1 and 2, respectively, the measures of maturity can be associated with the triangular distributions in a manner summarized in Table 4, below. As shown in Table 4, each uncertainty is associated with a NASA TRL, as well as with a return value, as such may be determined as described above. In turn, each NASA TRL is associated with a triangular distribution, defined by a minimum, a maximum and a mode, with a max/min and mean also shown. It will be noted that each percentage of uncertainty is associated with a triangular distribution having a maximum and a minimum equal to the truncated bounds of a risk/return distribution having a percentage standard deviation equal to the percentage of uncertainty.

After associating the triangular distributions with the measures of maturity, the triangular distributions and associated measures of maturity can be utilized to model monetary measures associated with a particular technology. With that, reference is now drawn to FIG. 4, which illustrates one embodiment of a method of determining a monetary distribution, such as a cost or revenue distribution, associated with a good. As shown in block 22, the method begins by assigning a measure of maturity, and therefore a triangular distribution, to the technology, as such may be assigned by a technologist or the like. Thereafter, as shown in block 24, a point cost (recurring or nonrecurring) or revenue value, or more typically a most likely cost or revenue value, associated with the technology is defined or otherwise provided, such as by an estimator or the like. As described below, the most likely cost or revenue value will thereafter be designated as the mode of a cost or revenue distribution.

After assigning a triangular distribution and defining a most likely cost or

TABLE 4

| Business Climate | | Tech. Maturity NASA | Triangular Distributions | | |
|---|---|---|---|---|---|
| Returns | Uncertainty | TRL | Max | Min | Mode |
| 10.0% | 20% | 9 | 1.50 | 0.72 | 1.00 |
| 12.5% | 30% | 8 | 1.80 | 0.64 | 1.00 |
| 15.0% | 40% | 7 | 2.13 | 0.58 | 1.00 |
| 17.5% | 50% | 6 | 2.47 | 0.55 | 1.00 |
| 20.0% | 60% | 5 | 2.61 | 0.52 | 1.00 |
| 22.5% | 70% | 4 | 3.16 | 0.50 | 1.00 |
| 25.0% | 80% | 3 | 3.51 | 0.48 | 1.00 |
| 27.5% | 90% | 2 | 3.85 | 0.46 | 1.00 |
| 30.0% | 100% | 1 | 4.20 | 0.45 | 1.00 | revenue, cost or revenue associated with the technology, and therefore the good, can be modeled based upon a cost or revenue distribution. In this regard, the cost or revenue distribution can be determined, such as by mapping the most likely cost or revenue onto the respective triangular distribution, as shown in block 26. For example, the cost or revenue distribution can be determined by determining the minimum and maximum values, or more typically the truncated minimum and maximum values, that define the cost or revenue distribution. In this regard, as the triangular distributions are typically normalized to a mode of one, the minimum and maximum values can be determined by simply multiplying the most likely cost or revenue by the minimum and maximum values of the respective triangular distribution. Thereafter, the cost or revenue distribution can be defined by the minimum and maximum, as well as the most likely cost or revenue.

From the cost or revenue distribution, a cost or revenue can be selected that accounts for a qualitative measure of maturity of the respective technology and, as such, the risks and returns associated with the respective technology, as shown in block 28. The cost or revenue can be selected in any of a number of different manners. For example, the cost or revenue value can be selected according to a method for randomly selecting the cost or revenue value, such as the Monte Carlo technique. As known to those skilled in the art, the Monte Carlo technique is a method of randomly generating values for uncertain variables to simulate a model.

After selecting the cost or revenue value, a number of other cost or revenue values can be selected, such as according to the Monte Carlo technique, as shown in blocks 28 and 30. After selecting a number of cost or revenue values, such as selecting N values, a sensitivity distribution can be determined based upon the values, as shown in block 32. In this regard, a sensitivity distribution can be determined by determining a mean and a standard deviation from the selected cost or revenue values, and thereafter defining the sensitivity distribution based upon the mean and standard deviation. The sensitivity distribution can be defined to comprise any of a number of different types of distributions, but in one embodiment, the sensitivity distribution comprises a lognormal distribution.

More particularly as to costs and revenues, then, when the values selected are recurring cost values, for example, a cost sensitivity distribution can be determined from the cost values. Alternatively, for example, when the values selected are revenue values, a price sensitivity distribution can be determined from the revenue values. In this regard, the cost sensitivity distribution generally assigns a probability of producing one unit of the good to each respective recurring cost at which manufacturers would produce the good. Similarly, the price sensitivity distribution generally assigns a probability of a unit purchase of the good to each respective price at which consumers would purchase the unit. The price sensitivity distribution and/or the cost sensitivity distribution can then be used, such as to model demand and associated profitability of a good, such as is described in U.S. patent application Ser. No. 10/453,727 entitled: Systems, Methods and Computer Program Products for Modeling Demand, Supply and Associated Profitability of A Good, filed Jun. 3, 2003; and U.S. patent application Ser. No. 10/453,779, entitled: Systems, Methods and Computer Program Products for Determining A Learning Curve Value and Modeling an Associated Profitability and Costs of A Good, filed Jun. 3, 2003, the contents of both which are hereby incorporated by reference in their entireties.

As will be appreciated, it is oftentimes desirable to determine whether the profitability of the good is positive before exercising a contingent claim, such as whether to initiate or continue the project. Alternatively, it is desirable to determine whether the profitability of the good is above a predetermined threshold before exercising the contingent claim. Contingent claims oftentimes come in the form of a call in which the manufacturer has an option to invest an amount of money, or additional amounts of money, in order to start producing or continue producing the good. As such, if the initial stages of the production and sale of the good have proved unsuccessful and/or if the future prospects for the profitability of the good appear bleak, the manufacturer will likely decline to invest the money, or additional money, and thereby forego exercise of the call and will therefore decline to produce the good or terminate production of the good. Alternatively, if the initial stages of the production and sale of the good have been successful and/or if the prospects of the profitability of the good are bright, the manufacturer will likely make the necessary investment in order to begin or continue production of the good.

Regardless of the type of contingent claim, it is desirable to determine the value of a good and, in particular, the contingent claim at the present time. By determining the value of the contingent claim, the manufacturer can avoid overpaying for production of the good as a result of an overvaluation of the contingent claim. Conversely, the manufacturer can identify goods in which the value of the contingent claim has been undervalued and can give strong consideration to investing in the production of these goods since they likely represent worthwhile investment opportunities. As such, by accurately capturing the cost and revenue risks, such as in determining the cost and price sensitivity distributions, the demand and cost of a good and, thus, the profitability of a good, can be accurately modeled. In this regard, the systems, methods and computer program products of the present invention can facilitate determining the value of the good and, in particular, the contingent claim at the present time. For more information on determining the value of the project, see U.S. patent application Ser. No. 09/902,021 entitled: Systems, Methods and Computer Program Products for Performing a Generalized Contingent Claim Valuation, the contents of which are hereby incorporated by reference in its entirety.

As will be appreciated by those skilled in the art, many goods are associated with more than one technology that may have different levels of development, or measures of maturity. In such instances, a cost or revenue distribution can be determined for each such technology associated with the good. For example, see Table 5, which illustrates a good having a total of twelve technologies utilized to bring the good to market, with each technology having an associated measure of maturity and a most likely recurring cost value. Then, from the triangular distributions associated with the measures of maturity and the most likely recurring cost value, a cost or revenue distribution, such as a recurring cost distribution, can be determined for each technology. In addition, a total cost or revenue distribution can be associated with the good based upon the sum of the most likely cost or revenue values of the individual technologies, as well as the sum of the minimum and maximum values, respectively, of the individual technologies.

TABLE 5

| Technology Cost/Risk Estimates | Maturity | Most Likely Cost | Low | High |
|---|---|---|---|---|
| Configuration Technology L2 | TRL 6 | $100 | $ 55 | $247 |
| Engineering Development L2 | TRL 7 | $200 | $116 | $426 |
| Manufacturing L2 | TRL 8 | $400 | $256 | $720 |
| Integration/Support L2 | TRL 9 | $300 | $216 | $450 |

| Node Cost/Risk Inputs | Maturity | Point Est. | Low | High |
|---|---|---|---|---|
| RecTechnology1 | TRL 6 | $ 600 | $ 330 | $ 1,482 |
| RecTechnology2 | TRL 7 | $ 400 | $ 232 | $ 852 |
| RecTechnology3 | TRL 5 | $ 600 | $ 312 | $ 1,686 |
| RecTechnology4 | TRL 7 | $ 200 | $ 116 | $ 426 |
| RecTechnology5 | TRL 5 | $ 600 | $ 312 | $ 1,686 |
| RecTechnology6 | TRL 5 | $ 400 | $ 208 | $ 1,124 |
| RecTechnology7 | TRL 7 | $ 100 | $ 58 | $ 213 |
| RecTechnology8 | TRL 5 | $2,000 | $ 1040 | $ 5,620 |
| Total Recurring Costs | | $5,900 | $3,251 | $14,932 |

To select a cost or revenue when the good is associated with a plurality of technologies, a cost or revenue can be selected for each technology based upon the respective cost or revenue distribution, such as according to the Monte Carlo technique.

Thereafter, the individual selected costs or revenues can be summed into a total cost or revenue for the good. Alternatively, a cost or revenue for the good can be selected, such as according to the Monte Carlo technique, based upon the total cost or revenue distribution, as such may be determined as described above. Like before, after selecting the cost or revenue value, a number of other cost or revenue values can be selected, such as according to the Monte Carlo technique. Then, a sensitivity distribution, such as a cost sensitivity or price distribution, can be determined based upon the values.

Therefore, embodiments of the present invention are capable of modeling a monetary measure of a good, such as a cost and/or revenue associated with a good, based upon technology maturity levels. In this regard, embodiments of the present invention can model quantitative risk/return as a function of qualitative measures of maturity to thereby reliably quantify the technical risk of a good based upon the level of maturity of the technologies associated with the good. Advantageously, embodiments of the present invention are capable of modeling the quantitative risk/return for technologies at a number of different levels of development, where each level of development has an associated technical risk, or uncertainty. In addition, embodiments of the present invention are capable of modeling quantitative risk/return in a robust manner such that monetary measures can be modeled in a number of different contexts, without modifying the model to fit a particular monetary measure, good, project or the like.

As shown in FIG. 4, the system of the present invention is typically embodied by a processing element and an associated memory device, both of which are commonly comprised by a computer 40 or the like. In this regard, as indicated above, the method of embodiments of the present invention can be performed by the processing element manipulating data stored by the memory device with any one of a number of commercially available computer software programs. In one embodiment, the method can be performed with data that is capable of being manipulated and/or presented in spreadsheet form. For example, the method can be performed by the processing element manipulating data stored by the memory device with Excel, a spreadsheet software program distributed by the Microsoft Corporation of Redmond, Wash., including Crystal Ball, a Monte Carlo simulation software program distributed by Decisioneering, Inc. of Denver, Colo. The computer can include a display 42 for presenting information relative to performing embodiments of the method of the present invention, including the various distributions, models and/or conclusions as determined according to embodiments of the present invention. To plot information relative to performing embodiments of the method of the present invention, the computer can further include a printer 44.

Also, the computer 40 can include a means for locally or remotely transferring the information relative to performing embodiments of the method of the present invention. For example, the computer can include a facsimile machine 46 for transmitting information to other facsimile machines, computers or the like. Additionally, or alternatively, the computer can include a modem 48 to transfer information to other computers or the like. Further, the computer can include an interface (not shown) to a network, such as a local area network (LAN), and/or a wide area network (WAN). For example, the computer can include an Ethernet Personal Computer Memory Card International Association (PCMCIA) card configured to transmit and receive information to and from a LAN, WAN or the like.

In one advantageous technique applicable to embodiments of the present invention, the methods according to embodiments of the present invention may be embodied in a software or data module, component, portfolio or the like, that can be manipulated or otherwise operated within a spreadsheet software program such as Excel. Such a technique may be advantageous in a number of different contexts, such as in the context of financial modeling and analysis. In this regard, modules, components and/or a portfolio that perform various financial modeling functions can be combined to gain a more complete understanding of a financial context. A brief description of such a technique as such may be applied to the present invention will now be described below.

According to such a technique, data capable of being manipulated to perform at least a portion of the methods of the present invention can be embodied in a module, which can thereafter be linked or otherwise associated with other portions of the methods of the present invention embodied in other modules so as to formulate a component. Then, if so desired, the component can be linked or otherwise associated with other components capable of performing other related methods to thereby form a portfolio. For example, methods of determining the price sensitivity distribution according to embodiments of the present invention can be embodied in one module. The module can then be linked or otherwise associated with another module for modeling demand such that the demand module can model demand based upon the price sensitivity distribution determined by the price sensitivity module. The demand module can then be linked or otherwise associated with a module for modeling cost to thereby formulate a component capable of modeling profitability based upon the demand and cost models. Then, if so desired, the component for modeling profitability can be linked or otherwise associated with another component to perform another function. For example, the component for modeling profitability can be linked or otherwise associated with a component capable of forecasting revenue over time to thereby create a business case for the good. In this regard, such a component capable of forecasting revenue over time may operate according to U.S. patent application Ser. No. 10/453, 396, entitled: Systems, Methods and Computer Program Products for Modeling Uncertain Future Benefits.

According to one aspect of the present invention, the system of the present invention generally operates under control of a computer program product according to another aspect of the present invention. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 1 and 3 are a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of modeling a monetary measure of a good, the method being performed by execution of computer-readable program code by at least one processor of at least one computer system, the method comprising:
    selecting, using at least one of the processors, at least one qualitative measure of maturity for at least one technology associated with the good, wherein each qualitative measure of maturity is associated with a distribution such that each technology is associated with the distribution of the respective qualitative measure of maturity;
    defining, using at least one of the processors, a monetary point associated with each technology;
    determining, using at least one of the processors, a monetary distribution for each technology based upon the respective monetary point and the respective distribution;
    selecting, using at least one of the processors, a plurality of monetary values including randomly selecting the plurality of monetary values for each technology based upon the respective monetary distribution; and
    generating, using at least one of the processors, a model of the monetary measure for the good based upon the selected monetary values for each technology.

2. A method according to claim 1, wherein selecting at least one qualitative measure comprises selecting at least one qualitative measure from a model of quantitative risk or return.

3. A method according to claim 2 further comprising generating a model of quantitative risk or return, including:
    determining a distribution for each of a plurality of risk values, wherein the plurality of risk values are ordered from a lowest risk value to a highest risk value; and
    assigning a qualitative measure of maturity to each of the plurality of distributions based upon a respective risk value to thereby generate a model of quantitative risk or return as a function of the plurality of measures of maturity, wherein the measures of maturity are ordered from a highest measure of maturity to a lowest measure of maturity, and wherein assigning the plurality of measures of maturity comprises assigning a higher measure of maturity to a distribution associated with a lower risk value.

4. A method according to claim 1, wherein defining a monetary point comprises defining a cost point, wherein determining a monetary distribution comprises determining a cost distribution for each technology based upon a respective cost point and the respective distribution, wherein selecting a plurality of monetary values comprises selecting a plurality of cost values, and wherein generating a model of a monetary measure comprises determining a cost sensitivity distribution based upon the selected cost values for each technology to thereby generate a model of the cost of producing the good.

5. A method according to claim 1, wherein defining a monetary point comprises defining a revenue point, wherein determining a monetary distribution comprises determining a revenue distribution for each technology based upon the respective revenue point and the respective distribution, wherein selecting a plurality of monetary values comprises selecting a plurality of revenue values, and wherein generating a model of a monetary measure comprises determining a price sensitivity distribution based upon the selected revenue values for each technology to thereby generate a model of the revenue associated with the good.

6. An apparatus for modeling a monetary measure of a good comprising:
    a processor configured to select or receive selection of at least one qualitative measure of maturity for at least one technology associated with the good, wherein each qualitative measure of maturity is associated with a distribution such that each technology is associated with the distribution of the respective qualitative measure of maturity,
    wherein the processor is also configured to define a monetary point associated with each technology, and thereafter determine a monetary distribution for each technology based upon the respective monetary point and the respective distribution,
    wherein the processor is additionally configured to select a plurality of monetary values including being configured to randomly select the plurality of monetary values for each technology based upon the respective monetary distribution, and
    wherein the processor is further configured to generate a model of the monetary measure for the good based upon the selected monetary values for each technology.

7. An apparatus according to claim 6, wherein the processor being configured to select or receive selection of at least one qualitative measure includes being configured to select or receive selection of at least one qualitative measure from a model of quantitative risk or return.

8. An apparatus according to claim 7, wherein the processor is also configured to generate a model of quantitative risk or return, including being configured to:
    determine a distribution for each of a plurality of risk values, wherein the plurality of risk values are ordered from a lowest risk value to a highest risk value; and
    assign a qualitative measure of maturity to each of the plurality of distributions based upon a respective risk value to thereby generate a model of quantitative risk or return as a function of the plurality of measures of maturity, wherein the measures of maturity are ordered from a highest measure of maturity to a lowest measure of maturity, and wherein the processor being configured to assign a qualitative measure of maturity to each of the plurality of distributions includes being configured to assign a higher measure of maturity to a distribution associated with a lower risk value.

9. An apparatus according to claim 6, wherein the processor being configured to define a monetary point includes being configured to define a cost point,
   wherein the processor being configured to determine a monetary distribution includes being configured to determine a cost distribution for each technology based upon the respective cost point and the respective distribution,
   wherein the processor being configured to select a plurality of monetary values includes being configured to select a plurality of cost values, and
   wherein the processor being configured to generate a model of a monetary measure includes being configured to determine a cost sensitivity distribution based upon the selected cost values for each technology to thereby generate a model of the cost of producing the good.

10. An apparatus according to claim 6, wherein the processor being configured to define a monetary point includes being configured to define a revenue point,
    wherein the processor being configured to determine a monetary distribution includes being configured to determine a revenue distribution for each technology based upon the respective revenue point and the respective distribution,
    wherein the processor being configured to select a plurality of monetary values includes being configured to select a plurality of revenue values, and
    wherein the processor being configured to generate a model of a monetary measure includes being configured to determine a price sensitivity distribution based upon the selected revenue values for each technology to thereby generate a model of the revenue associated with the good.

11. A computer program product for modeling a monetary measure of a good, the computer program product comprising a computer-readable storage medium having computer-readable program code portions stored therein, the computer-readable program portions comprising:
    a first executable portion configured to select or receive selection of at least one qualitative measure of maturity for at least one technology associated with the good, wherein each qualitative measure of maturity is associated with a distribution such that each technology is associated with the distribution of the respective qualitative measure of maturity;
    a second executable portion configured to define a monetary point associated with each technology;
    a third executable portion configured to determine a monetary distribution for each technology based upon the respective monetary point and the respective distribution;
    a forth executable portion configured to select a plurality of monetary values by randomly selecting the plurality of monetary values for each technology based upon the respective monetary distribution; and
    a fifth executable portion configured to generate a model of the monetary measure for the good based upon the selected monetary values for each technology.

12. A computer program product according to claim 11, wherein the forth executable portion being configured to select or receive selection of at least one qualitative measure of maturity includes being configured to select at least one qualitative measure from a model of quantitative risk or return.

13. A computer program product according to claim 12, wherein the computer-readable program portions further comprise a sixth executable portion configured to generate a model of quantitative risk or return, including being configured to:
    determine a distribution for each of a plurality of risk values, wherein the plurality of risk values are ordered from a lowest risk value to a highest risk value; and
    assign a qualitative measure of maturity to each of the plurality of distributions based upon a respective risk value to thereby generate a model of quantitative risk or return as a function of the plurality of measures of maturity, wherein the measures of maturity are ordered from a highest measure of maturity to a lowest measure of maturity, and wherein the sixth executable portion being configured to assign a qualitative measure of maturity to each of the plurality of distributions includes being configured to assign a higher measure of maturity to a distribution associated with a lower risk value.

14. A computer program product according to claim 11, wherein the second executable portion being configured to define a monetary point includes being configured to define a cost point,
    wherein the third executable portion being configured to determine a monetary distribution for each technology includes being configured to determine a cost distribution for each technology based upon the respective cost point and the respective distribution,
    wherein the forth executable portion being configured to select a plurality of monetary values includes being configured to select a plurality of cost values, and
    wherein the fifth executable portion being configured to generate a model of the monetary measure includes being configured to determine a cost sensitivity distribution based upon the selected cost values for each technology to thereby generate a model of the cost of producing the good.

15. A computer program product according to claim 11, wherein the second executable portion being configured to define a monetary point includes being configured to define a revenue point,
    wherein the third executable portion being configured to determine a monetary distribution for each technology includes being configured to determine a revenue distribution for each technology based upon the respective revenue point and the respective distribution,
    wherein the forth executable portion being configured to select a plurality of monetary values includes being configured to select a plurality of revenue values, and
    wherein the fifth executable portion being configured to generate a model of the monetary measure includes being configured to determine a price sensitivity distribution based upon the selected revenue values for each technology to thereby generate a model of the revenue associated with the good.

* * * * *